Nov. 30, 1965     K. E. CLAUSEN ETAL     3,220,701
WINCH
Filed April 29, 1963
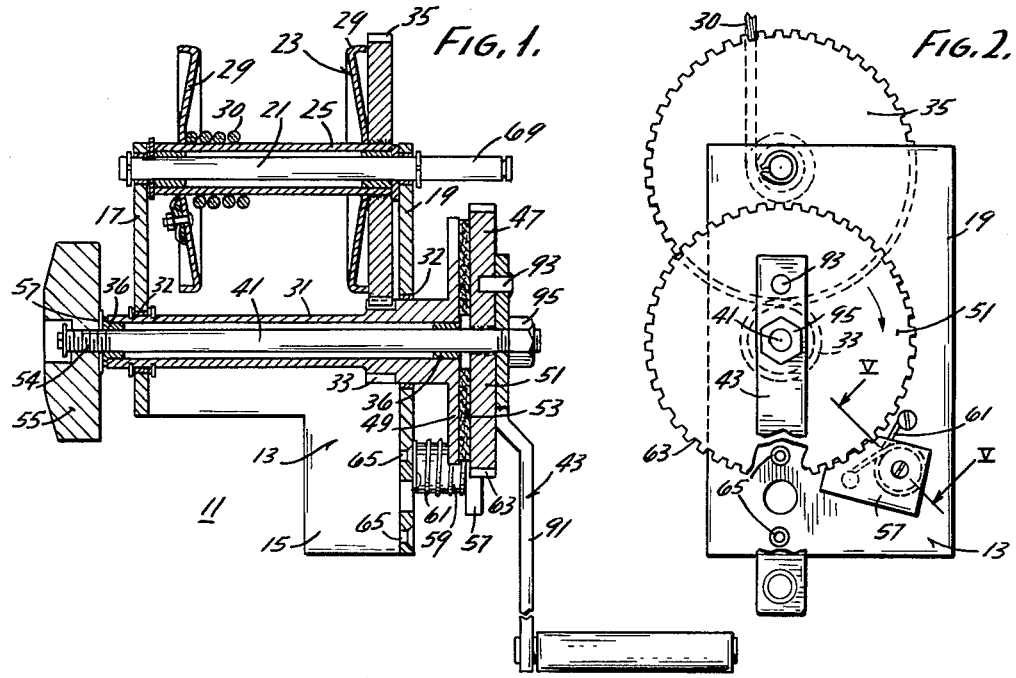
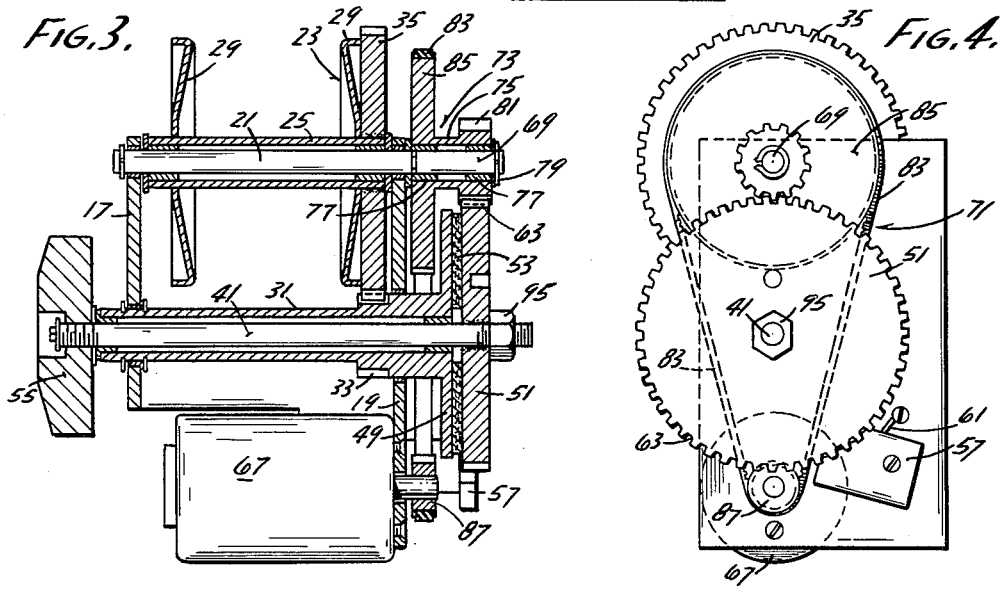
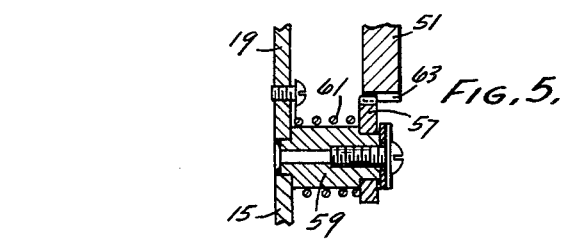
INVENTORS.
KENNETH E. CLAUSEN
BY KENNETH N. YEAGER
Wheeler, Wheeler & Wheeler
ATTORNEYS.

United States Patent Office 3,220,701
Patented Nov. 30, 1965

3,220,701
WINCH
Kenneth E. Clausen and Kenneth N. Yeager, Waukegan,
Ill., assignors to Outboard Marine Corporation, Waukegan, Ill., a corporation of Delaware
Filed Apr. 29, 1963, Ser. No. 276,595
9 Claims. (Cl. 254—187)

The invention relates to winches.

The invention provides a winch construction including a first rotatably mounted member which is connected to a reel or spool to effect rotation of the latter in response to rotation of the former, and a second rotatably mounted member which is releasably engageable by a clutch with the first rotatable member and is rotatable only in the direction which is effective to wind up the reel. Thus, with the clutch engaged, the reel can be wound up by rotating the second member, and unwinding of the reel is prevented because the second member is non-rotatable in the opposite direction. Unwinding of the reel is provided by uncoupling the first and second members to afford free rotation to the first member. This arrangement is particularly advantageous when the winch is manually operated by a handle or crank connected to the second member, as it eliminates reverse rotation of the handle during unwinding of the reel.

In one preferred embodiment of the invention, the first member constitutes a sleeve which is rotatably journaled by a frame and which carries a clutch plate. The second member constitutes a rod or arbor which is internally journaled within the sleeve for axial and rotative movement and which includes a clutch plate in facing engagement to the clutch plate on the sleeve. A ratchet is employed to permit rotation of the arbor only in the direction which is effective to wind up the reel. Means in the form of a handle or knob threaded on the arbor and located in abutting engagement with the sleeve are provided for axially displacing the sleeve and arbor relative to each other to releasably engage the clutch plates.

The invention also provides a winch which is easily converted to motorized operation. In said one preferred embodiment, the frame includes means for mounting an electric motor and a stud extending in parallel relation to the arbor for receipt of a pinion constituting one part of a speed reducing power train connectable between the electric motor and the arbor. In addition, the crank handle is releasably secured to the arbor clutch plate to permit its removal when the winch is converted to motorized operation.

The invention also provides a reel which includes a pair of flanges which are dished about the core or center of the reel in concave relation to each other, whereby during winding of a cable, rope, or the like on the reel, engagement of the cable with the flanges, as each row of coils is completed, serves to displace the cable axially of the reel for disposition in the groove between the adjacent loops in the just completed row of coils. Thus, orderly winding of the cable on the reel is facilitated.

Other objects and advantages of the invention will become known by reference to the following description and accompanying drawings of one embodiment of the invention.

In the drawings:

FIGURE 1 is a side elevational view, partially in section, of a winch embodying various of the features of the invention, the winch being arranged for manual operation;

FIGURE 2 is an end elevational view of the winch shown in FIGURE 1;

FIGURE 3 is a side elevational view of the winch shown in FIGURE 1 when converted for motorized operation;

FIGURE 4 is an end elevational view of the converted winch shown in FIGURE 3; and FIGURE 5 is an enlarged, fragmentary sectional view taken along line 5—5 of FIGURE 2.

The winch 11 includes a supporting frame 13 which primarily comprises a U-shaped bracket 15 having a pair of opposing arms 17 and 19. Extending between the arms 17 and 19 is a cross shaft 21 on which a reel or spool 23 is rotatably mounted. The reel 23 comprises a tubular center or core 25 and a pair of axially spaced flanges 29 and fixed to the core 25.

In order to automatically locate the cable 30 carried by the reel 23 in the groove formed by the endmost two coils in a completed row of coils during initial formation of a new row of coils, the flanges 29 are each concavely dished with respect to each other about the center or core. At their extremities, each of the flanges 29 flares outwardly for smooth guiding of the cable onto the reel.

Rotatably journaled in bearings 32 supported on each of the arms 17 and 19 is a sleeve 31 which is disposed in parallel relation to the reel axis and which is rotatably connected to the reel 23. While various means can be employed to rotatably connect the sleeve and the reel, in the disclosed embodiment, the sleeve 31 includes, within the bracket 15 and adjacent to the arm 19, a pinion 33 which is meshed with a gear 35 fixed to the core of the reel 23 adjacent to the flange 29. Journaled for concentric rotation and for axial displacement in bearings 36 within the sleeve 31 is an arbor 41 which extends outwardly from both ends of the sleeve 31 and which, as shown in FIGURE 1, is connected at one end with a crank or handle 43. Alternatively, as shown in FIGURES 3 and 4, the arbor 41 can be rotated by power means as will be explained.

In order to provide for releasable engagement of the sleeve 31 with the arbor 41, clutch means 47 are provided. While various arrangements can be used, in the disclosed construction, the sleeve 31 and the arbor 41 respectively carry clutch plates 49 and 51 in facing relation to each other. Secured to the clutch plate 49 on the sleeve 31 is a clutch lining 53.

The clutch plates 49 and 51 are engageable to rotatably connect the arbor 41 and the sleeve 31 by means for axially displacing the sleeve and arbor relative to each other. Specifically, at its other end, the arbor 41 includes a threaded portion 54 receiving a handle or knob 55 which, through a washer 57, abuts against the adjacent end of the sleeve 31. Threading of the handle knob 55 onto the arbor 41 serves to displace the arbor 41 to the left, as shown in the drawings, relative to the sleeve 31, so as to engage the clutch lining 53 with the arbor clutch plate 51. When the handle knob 55 is unthreaded along the arbor portion 54, the arbor 41 is permitted to move to the right, as shown in the drawings, thereby disengaging the clutch 47 and permitting rotation of the sleeve 31 and reel 23 independently of the arbor 41.

In order to prevent unwinding of the reel 23 when the clutch 47 is engaged and to prevent rotation of the crank handle 43 during unwinding of the reel 23 when the clutch 47 is disengaged, means are provided for limiting arbor rotation to the direction which is effective to wind up the reel 23. While various arrangements can be used, in the disclosed construction, a ratchet or pawl 57 is carried by a stud 59 extending from the arm 19 of the bracket 15 and is biased by a spring 61 into engagement wtih a gear 63 formed on the outer periphery of the arbor clutch plate 51.

In order to accommodate conversion of the winch shown in FIGURES 1 and 2 for motorized operation, the frame 13 includes means in the form of holes 65 for mounting an electric motor 67 (see FIGURES 3 and 4). In addition, the frame 13 also includes a stud 69 which extends from the bracket arm 19 in parallel relation to the axis of arbor rotation and which is adapted to receive components of a speed reducing power train 71 connectable between the arbor 41 and the electric motor 67. More particularly, the stud 69 is adapted to rotatably receive a unitary pulley and pinion assembly 73 which includes a sleeve 75 mountable on a pair of bearings 77 slidable onto the stud 69. A suitable snap ring 79 can be employed to retain the bearings 77 and the unitary pulley and pinion assembly 73 on the stud 69. The unitary pulley and pinion assembly 73 is drivingly connected to the arbor 41 by meshing engagement of a pinion 81 with the gear 63 on the periphery of the clutch plate 51. The pulley and pinion assembly 73 is drivingly connected to the motor 67 by a V-belt 83 which is trained around a V-belt pulley 85 and around a pulley 87 carried on the output shaft of the motor 67.

In order to facilitate removal of the crank handle 43 when the winch 11 is motorized, the crank handle 43 is detachably connected to the arbor 41. More particularly, the crank arm 91 of the crank handle 43 is apertured for passage therethrough of the adjacent end of the arbor 41 and includes a pin or stud 93 which is received in a mating hole in the clutch plate 51 so as to prevent relative rotation between the crank handle 43 and the arbor 41. The crank handle 43 is retained in assembled relation to the arbor 41 by a nut 95 threaded on the adjacent end of the arbor.

In operation, when it is desired to wind the cable 30 on the reel 23, the handle knob 55 on the arbor shaft 41 is tightened until the clutch 47 is engaged. Subsequently, rotation of the arbor 41 serves to rotate the sleeve 31, and through the pinion 33 and gear 35 to drive the reel 23 so as to wind up the cable 30. Engagement of the ratchet 57 with the gear 63 prevents unwinding of the reel 23 when the clutch 47 is engaged. When it is desired to unwind the reel, the handle knob 55 is loosened on the arbor 41, thereby permitting disengagement of the clutch 47 and free rotation of the sleeve 31 and reel 23. During such unwinding, the crank handle 43 does not rotate because of the engagement of the ratchet 57 with the gear 63.

When it is desired to convert the winch 11 for motorized operation, the crank handle 43 is removed and the pulley and pinion assembly 73 is assembled on the stud 69 with the pinion 81 in meshing engagement with the gear 63. In addition, the motor 67 is mounted on the frame 13 and the V-belt 83 is trained around the pulleys 85 and 87 to complete driving connection of the motor 67 to the arbor 41. As when the winch is arranged for manual operation, the ratchet 57 serves to limit arbor rotation to the direction which is effective to wind up the reel 23, and, in co-operation wtih the clutch 47, serves to prevent unwinding of the reel 23 when the clutch 47 is engaged.

Various features of the invention are set forth in the following claims.

What is claimed is:

1. A winch comprising a supporting frame, a first elongated, axially hollow member, bearings on said frame rotatably mounting said first member at two points spaced axially of said first member, means rotatably connecting said first member to a reel for rotation of the latter in response to rotation of the former, a second member, bearings on said first member rotatably carrying said second member partially telescopically within said first member on an axis coinciding with the axis of said first member, releasably engageable clutch means for connecting said first and second members, means connected to said second member for effecting rotation thereof in the one direction which is effective, when said clutch means is engaged, to wind up the reel, and means on said frame for preventing rotation of said second member in the direction counter to said one direction, whereby unwinding of the reel is prevented when said clutch means is engaged.

2. A winch comprising a supporting frame, a reel, means rotatably mounting said reel on said frame, said reel including a core and a pair of flanges secured to said core in opposed relation to each other, each of said flanges being concavely dished with respect to each other about said core, a sleeve, bearings on said frame rotatably mounting said sleeve at two points spaced axially of said sleeve, means rotatably connecting said sleeve and said reel for rotation of the latter in response to rotation of the former, an arbor rotatably carried by and within said sleeve in telescopic relation to said sleeve, releasably engageable clutch means for connecting said sleeve and said arbor, means connected to said arbor for effecting rotation thereof in the one direction which is effective, when said clutch means is engaged, to wind up said reel, and means on said frame for preventing rotation of said arbor in the direction counter to said one direction, whereby unwinding of said reel is prevented when said clutch means is engaged.

3. A winch comprising a supporting frame, a reel rotatably mounted on said frame, a sleeve, bearings on said frame rotatably mounting said sleeve at two points spaced axially of said sleeve, means rotatably connecting said sleeve to said reel for rotation of the latter in response to rotation of the former, a first clutch plate mounted on said sleeve, an arbor having first and second parts, bearings on said sleeve rotatably carrying said first part of said arbor within said sleeve and with said second arbor part exterior of said sleeve, a second clutch plate carried on said second part of said arbor in facing relation to said first clutch plate, and means for axially displacing said sleeve and said arbor relative to each other to releasably engage said clutch plates so as to effect driving relation between said arbor and said reel.

4. A winch comprising a supporting frame, a reel rotatably mounted on said frame, a sleeve rotatably mounted on said frame, means rotatably connecting said sleeve to said reel for rotation of the latter in response to rotation of the former, a first clutch plate mounted on said sleeve, an arbor carried by and in telescopic relation to said sleeve, a second clutch plate carried on said arbor in facing relation to said first clutch plate, a motor mounted on said frame, means drivingly connecting said motor to said arbor, and means independent of said means drivingly connecting said motor to said arbor for axially displacing said sleeve and said arbor relative to each other to releasably engage said clutch plates so as to effect driving relation between said arbor and said reel.

5. A winch in accordance with claim 4 including means for preventing rotation of said arbor in a direction counter to the direction which is effective to wind up the reel whereby, when said clutch plates are engaged, unwinding of the reel is prevented and whereby unwinding of the reel is afforded by releasing the engagement of said clutch plates.

6. A winch comprising a supporting frame, a first member rotatably mounted on said frame, means rotatably connecting said first member to a reel for rotation of the latter in response to rotation of the former, a second member carried by said frame on an axis coinciding with the axis of said first member, releasably engageable clutch means for connecting said first and second members and including a first clutch plate mounted on said first member, a second clutch plate carried on said second member in facing relation to said first clutch plate, and means for axially displacing said first and second members relative to each other to releasably engage said clutch plates, said means for axially displacing said first and second members being located, at least in part, to one side of said clutch plates, means connected to said second member and operable independently of said means for axially displacing said first and second members for effecting rotation of said second member in the direction which is effective, when said clutch means is engaged, to wind up the reel, said means for effecting rotation of said second member being located to the other side of said clutch plates, and means on said frame for preventing rotation of said second member in the direction counter to said first mentioned direction, whereby unwinding of the reel is prevented when said clutch means is engaged.

7. A winch comprising a supporting frame, a first member rotatably mounted on said frame, means rotatably connecting said first member to a reel for rotation of the latter in response to rotation of the former, a second member rotatably carried by said frame on an axis coinciding with the axis of said first member, a gear fixed on said second member, a stud extending from said frame in parallel relation to said second member, a pinion rotatably received on said stud in meshing engagement with said gear, a pulley fixed to said pinion for rotation therewith, an electric motor mounted on said frame and including an output pulley, a drive belt connecting said pulleys, releasably engageable clutch means for connecting said first and second members, and a ratchet mounted in said frame and in engagement wtih said gear for preventing rotation of said second member in the direction which is effective to unwind the reel.

8. A winch comprising a supporting frame, a reel, means rotatably mounting said reel on said frame, a sleeve rotatably mounted on said frame, means rotatably connecting said sleeve and said reel for rotation of the latter in response to rotation of the former, an arbor rotatably carried by said sleeve in telescopic relation to said sleeve, releasably engageable clutch means movable axially of said sleeve and said arbor for rotatably connecting said sleeve and said arbor, means for axially displacing said sleeve and said arbor relative to each other to operate said clutch means, means connected to said arbor and independent of said means for axially displacing said sleeve and said arbor for effecting rotation of said arbor in the direction which is effective, when said clutch means is engaged, to wind up said reel, and means on said frame for preventing rotation of said arbor in the direction counter to said first mentioned direction, whereby unwinding of said reel is prevented when said clutch means is engaged.

9. A winch comprising a supporting frame, a reel, means rotatably mounting said reel on said frame, a sleeve rotatably mounted on said frame, means rotatably connecting said reel and said sleeve for rotation of the latter in response to rotation of the former, an arbor rotatably carried by said sleeve in telescopic relation to said sleeve, a gear fixed to said arbor, releasably engageable clutch means for rotatably connecting said sleeve and said arbor, a handle detachably connected to said arbor in rotative driving relation thereto, means on said frame extending in parallel relation to said arbor and adapted for rotatably receiving a pinion adapted to mesh with said gear, and a ratchet mounted on said frame in engagement with said gear to prevent rotation of said arbor in a direction which is effective to unwind said reel.

References Cited by the Examiner
UNITED STATES PATENTS

| | | | |
|---|---|---|---|
| 1,148,609 | 8/1915 | Miller | 254—187 |
| 1,522,463 | 1/1925 | Donat | 254—187 |
| 1,623,021 | 3/1927 | Smaltz | 254—187 |
| 2,166,201 | 7/1939 | Van Cleave | 254—149 |
| 2,207,500 | 7/1940 | Van Cleave | 74—505 |
| 2,244,571 | 6/1941 | Pignani | 254—187 |
| 2,282,305 | 5/1942 | Bruno | 254—186 |
| 2,681,205 | 6/1954 | Bannister | 254—187 |

SAMUEL F. COLEMAN, *Primary Examiner.*